United States Patent
Yoshino et al.

(10) Patent No.: US 7,581,712 B2
(45) Date of Patent: Sep. 1, 2009

(54) VALVE

(75) Inventors: Kenro Yoshino, Nobeoka (JP); Takeshi Hamada, Nobeoka (JP)

(73) Assignee: Asahi Organic Chemicals Industry Co., Ltd., Miyazaki (JP)

( * ) Notice: Subject to any disclaimer, the term of this patent is extended or adjusted under 35 U.S.C. 154(b) by 0 days.

(21) Appl. No.: 10/587,470

(22) PCT Filed: Jan. 29, 2004

(86) PCT No.: PCT/JP2004/000800

§ 371 (c)(1), (2), (4) Date: Jul. 27, 2006

(87) PCT Pub. No.: WO2005/073605

PCT Pub. Date: Aug. 11, 2005

(65) Prior Publication Data

US 2007/0120086 A1 May 31, 2007

(51) Int. Cl.
F16K 1/00 (2006.01)
F16K 15/00 (2006.01)

(52) U.S. Cl. ........................ 251/331; 251/61

(58) Field of Classification Search ............ 251/61, 251/61.1, 61.2, 61.3, 61.4, 61.5, 331
See application file for complete search history.

(56) References Cited

U.S. PATENT DOCUMENTS 6,189,861 B1 * 2/2001 Gotch et al. ................ 251/331
6,959,725 B2 * 11/2005 Yoshino et al. ........ 137/505.25
7,063,304 B2 * 6/2006 Leys .......................... 251/331
7,108,241 B2 * 9/2006 Yoshino et al. ............. 251/61.5

FOREIGN PATENT DOCUMENTS

| JP | 45-26541 | 10/1970 |
|----|----------|---------|
| JP | 63-186077 | 8/1988 |
| JP | 1-92565 | 6/1989 |
| JP | 5-57562 | 7/1993 |
| JP | 5-240361 | 9/1993 |
| JP | 6-2775 | 1/1994 |
| JP | 06-002775 | 1/1994 |
| JP | 9-217844 | 8/1997 |
| JP | 2001-208237 | 8/2001 |
| JP | 2002-513457 | 5/2002 |
| JP | 2002-340203 | 11/2002 |

* cited by examiner

Primary Examiner—John K Fristoe, Jr.
(74) Attorney, Agent, or Firm—Buchanan Ingersoll & Rooney, PC

(57) ABSTRACT

A valve (100) includes a body (1) having a valve seat (10) formed therein, a bonnet (2), a diaphragm (3) supporting a valve element (18) abutting against and moving away from the valve seat (10), and an elastic member such as an O-ring (5). The body (1) is formed with an annular groove (13) extending around the valve seat (10), and the diaphragm (3) is provided at the peripheral edge (20) with an annular engagement part (21) formed to have an approximate L-shape in cross-section. The annular engagement part (21) is inserted into the annular groove (13) in a tight state by the elastic member disposed between the bonnet (2) and the annular engagement part (21) of the diaphragm (3).

5 Claims, 5 Drawing Sheets

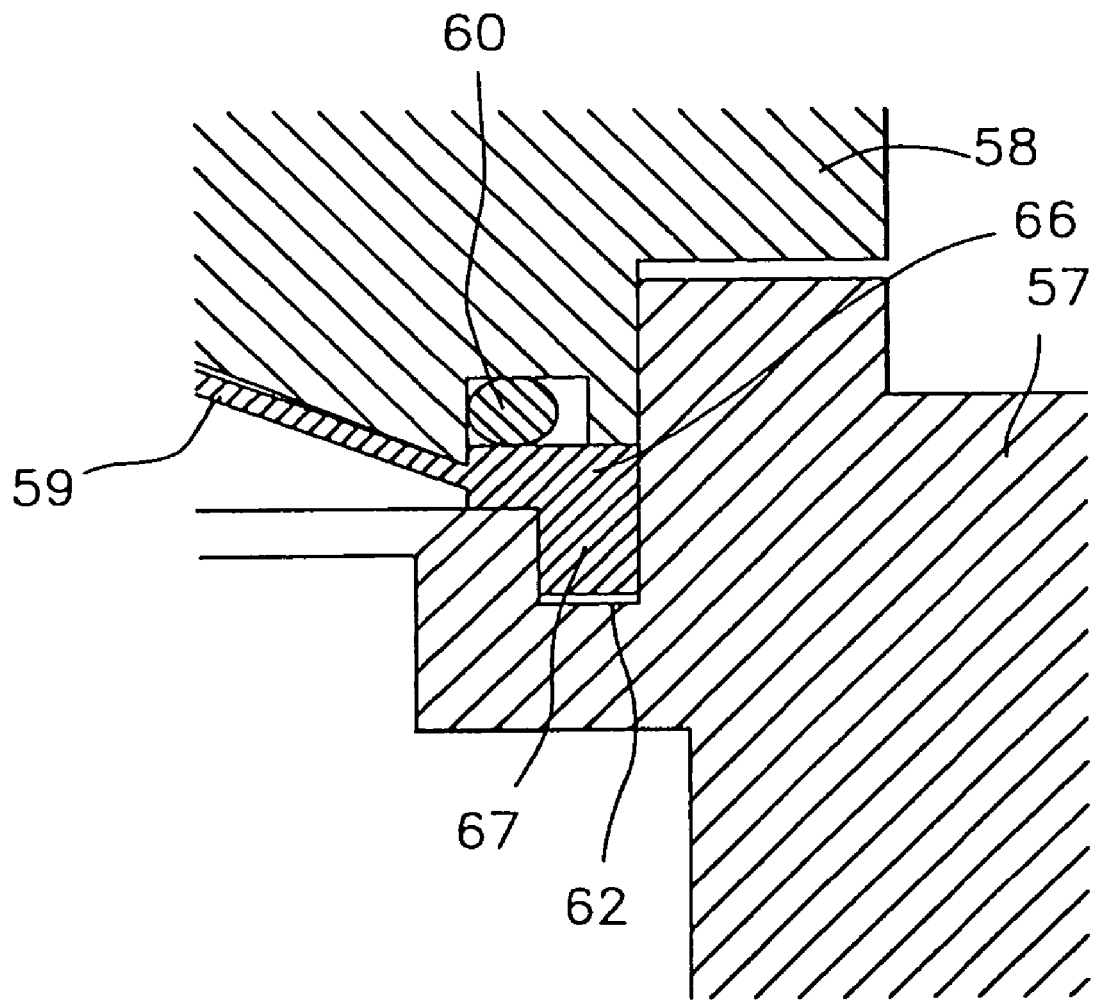

VALVE

TECHNICAL FIELD

The present invention relates to a valve using a diaphragm and used in a fluid transport pipe, and more particularly relates to a valve improved in the seal performance of the diaphragm.

BACKGROUND ART

The diaphragm valve using a diaphragm and used in various types of chemical lines, pure water lines, etc. in the past, as shown in FIG. 6, is provided with a body 47 having an annular groove 51 formed thereon, a bonnet 48, and a diaphragm 49 having an annular engagement part 56. The annular engagement part 56 of the diaphragm 49 is engaged with the annular groove 51 of the body 47. The body 47 and the bonnet 48 clamp and fixedly hold the annular engagement part 56 and its peripheral edge 55 between them so as to seal between the body 47 and bonnet 48 and prevent leakage of fluid to outside the valve. However, with this seal method, long term fluid pressure fluctuations, temperature changes, etc. cause creep at the seal part configured in the above way. Therefore, there is a problem that the fluid can leak to the outside. This tendency is particularly remarkable in polytetrafluoroethylene (hereinafter referred to as "PTFE"), a tetrafluoroethylene-perfluoroalkylvinyl ether copolymer (hereinafter referred to as the "PFA"), or other fluororesin preferably used as the diaphragm material.

In order to solve the above problem, the applicant previously invented and filed a patent application for a high safety diaphragm valve improved over the conventional diaphragm valve, extremely simple in structure, and free from fluid leakage to outside the valve even if creep occurs at the seal part (see Japanese Unexamined Patent Publication No. 6-2775). Explaining the structure with reference to FIG. 7, the diaphragm valve includes a body 57 having an annular groove 62 formed thereon, a bonnet 58, and a diaphragm 59 provided at the peripheral edge 66 thereof with an annular engagement part 67. The annular engagement part 67 of the diaphragm 59 is engaged with the annular groove 62 formed on the body 57. Further, the peripheral edge 66 of the diaphragm 59 is clamped between the body 57 and bonnet 58 via an elastic member 60 (O-ring).

However, in the above-mentioned diaphragm valve, a fluororesin is used for the material of the body, diaphragm, etc. Further, it is found that there is a danger of fluid leakage to the outside of the valve when the pressure or temperature of the fluid changes greatly over a long time or the valve is otherwise placed under conditions where the seal part is very susceptible to creep.

DISCLOSURE OF THE INVENTION

Therefore, an object of the present invention is to solve the above problem in the prior art and to provide a valve having an improved seal structure wherein the seal part does not allow fluid leakage even if creep occurs due to fluid pressure fluctuations, temperature changes, etc.

According to the present invention, there is provided a valve which includes a body having a valve seat formed therein, a bonnet, and a diaphragm abutting against and moving away from the valve seat, the body and the bonnet clamping and holding a peripheral edge of the diaphragm so as to seal the fluid inside the body, the valve characterized in that the valve further includes an elastic member, the body is formed with an annular groove extending around the valve seat, the diaphragm is provided at the peripheral edge thereof with an annular engagement part formed to have an approximate L-shape in cross-section, and the annular engagement part is fitted into the annular groove in a tight state by the elastic member disposed between the bonnet and the annular engagement part of the diaphragm.

Preferably, in the above valve, the annular groove has an inner side surface inclined downward toward the outside and the elastic member has an inner circumference inclined corresponding to the inclined surface of the annular groove.

Preferably, the elastic member is an O-ring.

Further, an annular projection abutting against the surface of the diaphragm may be provided at the bottom surface of the annular groove, or an annular projection abutting against the surface of the diaphragm may be provided at the part of the surface of the body clamping the diaphragm with the bonnet.

A preferable valve having the structure of the present invention may include a diaphragm valve, a regulator, a flow rate control valve, etc.

In the present invention, PTFE or PFA or another fluororesin is preferably used as the material of the body, the bonnet, etc., due to their excellent chemical resistance and low elution of impurities. However, polyvinyl chloride, polypropylene, or another plastic or a metal may be used. The invention is not particularly limited in this. Further, PTFE, PFA, or another fluororesin is preferably used as the material of the diaphragm. However, the invention is not particularly limited in this.

BRIEF DESCRIPTION OF THE DRAWINGS

The above and other objects, features, and advantages of the present invention will be described blow in further detail based on embodiments of the present invention with reference to the accompanying drawings, in which:

FIG. 7 is an enlarged longitudinal sectional view showing principle parts of another prior art.

BEST MODE FOR CARRYING OUT THE INVENTION

Embodiments of the present invention will be described below with reference to the drawings, but the present invention is of course not limited to these embodiments.

Figure 1:
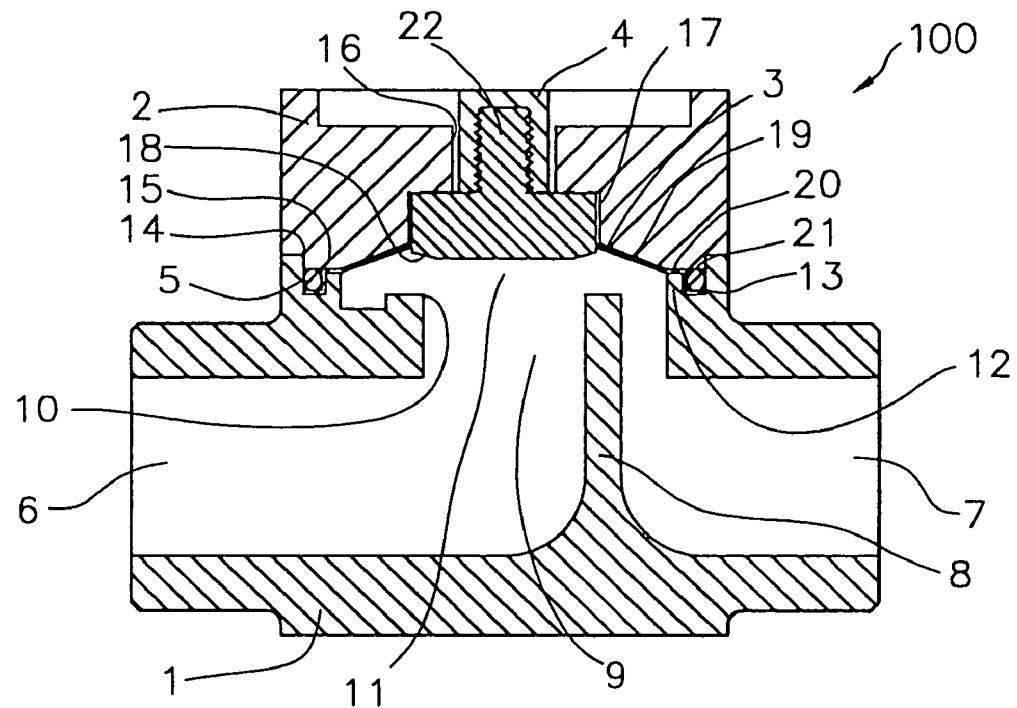
FIG. 1 is a longitudinal sectional view showing principal parts of a valve according to a first embodiment of the present invention.
Figure 2:
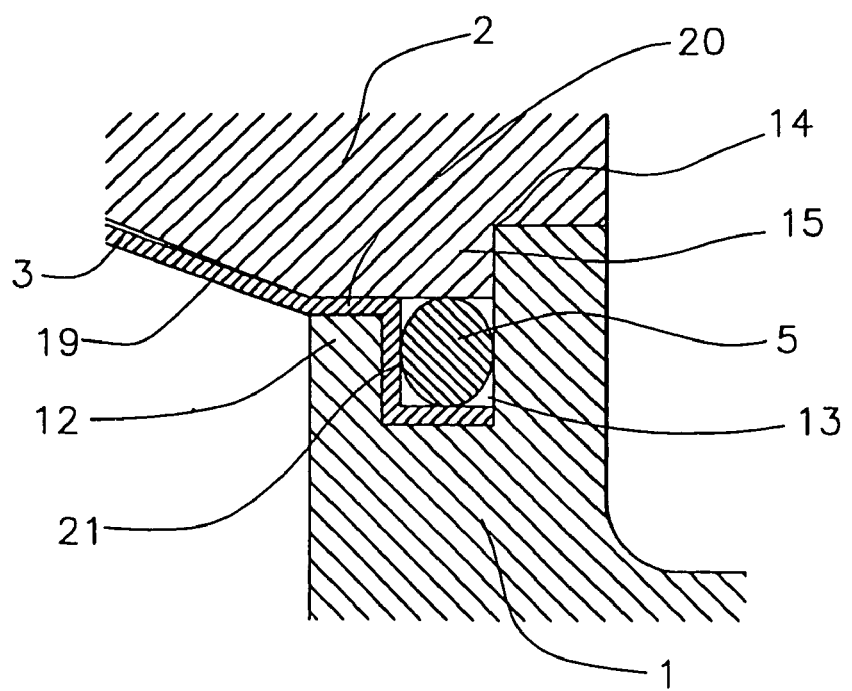
FIG. 2 is an enlarged longitudinal sectional view showing principle parts of a seal part at the outer circumference of the diaphragm in FIG. 1.

The explanation will be given below based on FIG. 1 and FIG. 2 showing an embodiment of the present invention.

A valve 100 is provided with a valve body 1 (hereinafter referred to as the "body"), a bonnet 2, and a diaphragm 3.

The body 1 is a stop valve type valve body made of PTFE and having a fluid inlet 6 and a fluid outlet 7. A separating wall 8 provided inside it separates a fluid inlet 6 and a fluid outlet 7. The body 1 is further provided with an opening 9 communicating the fluid inlet 6 with a valve chamber 11. The peripheral edge of the opening 9 forms an annular valve seat 10. The body 1 is provided at the top peripheral edge thereof with an annular groove 13. A flat part 12 is provided inside the annular groove 13. The top surface of the flat part 12 is positioned above the valve seat 10 and below the top surface of an outside wall of the annular groove 13. Therefore, a step difference 14 is formed at the top of the annular groove 13.

The bonnet 2 is engaged with and fixedly secured to the top part of the body 1 by nuts and bolts etc. (not shown). The bottom peripheral edge thereof is provided with a annular projection 15 which is inserted into the step difference 14 formed at the body 1. The bonnet 2 is provided at the bottom center thereof with a through-hole 16. A compressor 4 is supported in a state able to slide up and down in the through-hole 16. At the bottom side of the through-hole 16, a circular recess 17 having a diameter larger than the diameter of the through-hole 16 is provided. The bottom surface connecting the outer edge of the recess 17 and the inside end of the projection 15 forms an inclined surface descending toward the outside.

The diaphragm 3 is made of PTFE and is provided at the center bottom thereof with a valve element 18 received in a recess 17 of the bonnet 2. The valve element 18 is provided at the center top surface thereof with a male screw 22 projecting out and screwed into an end of the compressor 4 for securing. Therefore, the valve element 18 moves up or down along with the up or down motion of the compressor 4, whereby it abuts against or moves away from the valve seat 10 of the body 1 to enable the fluid to be stopped or released. The valve element 18 is formed at the peripheral edge thereof with a film part 19 and an annular engagement part 21 bent down from a peripheral edge 20 and having an approximate L-shape, which are integrated with each other. The peripheral edge 20 is clamped and fixedly held between the flat part 12 of the body 1 and the projection 15 of the bonnet 2, while the annular engagement part 21 is fixedly engaged with the annular groove 13 of the body 1. Further, the outer side surface of the annular engagement part 21 is pressed against the inner side surface of the annular groove 13 by an elastic member constituted by an O-ring 5 made of fluororubber, and the bottom surface thereof is pressed by the projection 15 of the bonnet 2 via the O-ring 5 against the bottom surface of the annular groove 13. Here, the annular engagement part 21 may have an inclined L-shape (see FIG. 3) or a shape in which a bottom surface is not horizontal but curved. So long as being shaped to match with the annular groove 13, the invention is not particularly limited.

The valve 100 of the above embodiment configured in the above way operates as follows.

In FIG. 1, when fluid flows into the valve 100, that fluid flows in from the fluid inlet 6, passes through the opening 9 and the valve chamber 11 formed between the top of the body 1 and the diaphragm 3, and flows out to the fluid outlet 7. At this time, the fluid reaching the valve chamber 11, due to the action of its pressure, attempts to pass through the clearance between the peripheral edge 20 and annular engagement part 21 of the diaphragm 3 and the body 1 to flow to the outside of the valve 100.

However, the peripheral edge 20 and annular engagement part 21 are tightly clamped and secured by the bonnet 2 to the flat part 12 and annular groove 13 of the body 1. Therefore, flow of the fluid to the outside of the valve 100 is obstructed.

Further, even if the fluid pressure or temperature fluctuates over a long period thereby causing creep at the peripheral edge 20 and annular engagement part 21 of the diaphragm 3 or if the flat part 12 and annular groove 13 of the body 1 become distorted etc., the annular engagement part 21 is constantly pressed against the annular groove 13 by the projection 15 of the bonnet 2 and the elastic action of the O-ring 5. Therefore, the clearance between annular groove 13 and the annular engagement part 21 no longer expands and flow of the fluid to outside of the valve 100 is obstructed.

Further, by using the O-ring 5 as the elastic member as in this embodiment, the object of making the side surface and bottom surface of the annular engagement part 21 of the diaphragm 3 simultaneously and intensively press against the inner side surface and bottom surface of the annular groove 13 of the body 1 can be achieved most effectively and the creep of the elastic member itself can be kept to a minimum. Therefore, the synergistic effect of enabling such an elastic action over a long period can also be given. Further, even if trouble occurs such as entry of foreign matter or another factor damaging the seal part of the diaphragm 3, the O-ring 5 is simultaneously pressed against the outer side surface of the annular groove 13 of the body 1. Therefore, in the end, fluid can be stopped from passing between the O-ring 5 and the annular groove 13, that is, fluid will not leak to the outside of the valve 100. Here, as the material of the O-ring 5, a fluororubber having a superior chemical resistance is preferably used, but any material may be used if having a performance suited to the conditions of use. Further, instead of an O-ring 5, a sheet-type packing or a rubbery plastic or other elastic member may also be used. The invention is not particularly limited in this.

Next, when drive force is imparted from the outside to make the compressor 4 move downward, the valve element 18 of the diaphragm 3 also moves downward linked with this and abuts against the valve seat 10 of the body 1. Further, by the valve element 18 being pressed against the valve seat 10, the opening 9 is completely blocked and the valve 100 becomes closed. Conversely, when the compressor 4 is made to move upward, the valve element 18 also moves upward away from the valve seat 10, the valve element 18 is housed in the recess 17 of the bonnet 2, and the top surface of the valve element 18 contacts the top surface of the recess 17, while the film part 19 contacts the inclined surface of the bonnet 2 to be stopped from upward movement and the valve 100 becomes completely opened (state of FIG. 1).

Figure 3:
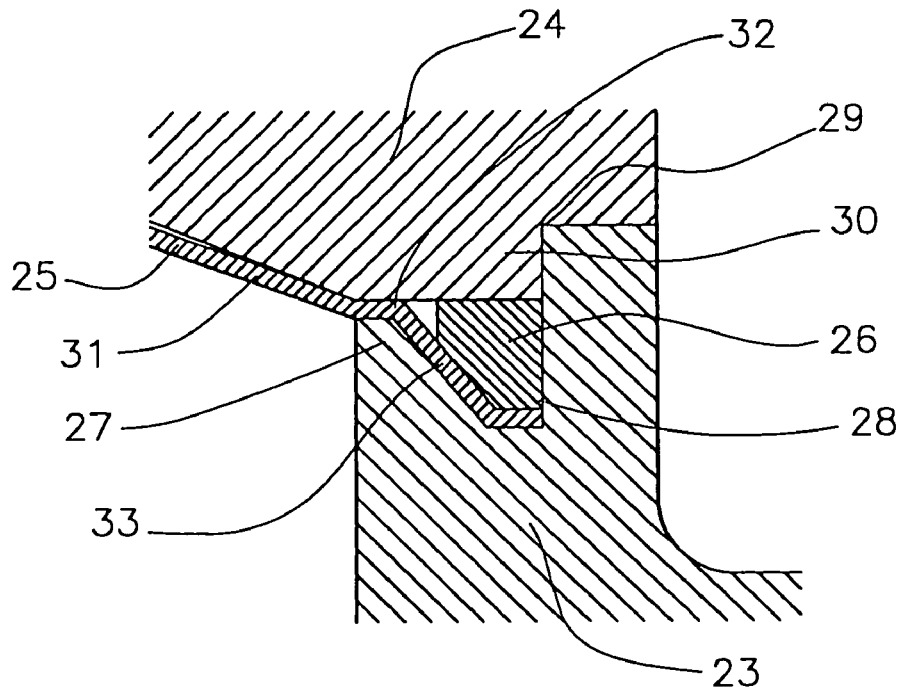
FIG. 3 is an enlarged sectional view showing principal parts of a valve according to a second embodiment of the present invention.

FIG. 3 is an enlarged longitudinal cross-sectional view showing principle parts of a valve according a second embodiment of the present invention. The valve, like the first embodiment, is provided with a body 23, a bonnet 24, and a diaphragm 25. The body 23 has a flat part 27, an annular groove 28, and a step difference 29, while the bonnet 24 has a projection 30, and the diaphragm 25 has a film part 31, a peripheral edge 32, and an annular engagement part 33. The points of difference in the configuration of this embodiment from the first embodiment are that the inner side surface of the annular groove 28 is formed to be inclined and the annular engagement part 33 of the diaphragm 25 is also formed to be inclined by the same angle as the gradient of the inner side surface of the annular groove 28 and that a packing 26 having at the inner circumference thereof a surface inclined by the same angle as that gradient is used as the elastic member. Since the rest of the configuration is the same as the first embodiment, an explanation will be omitted.

In the seal structure of this embodiment, the annular groove 28 is provided with a gradient at the inner side surface thereof, and the flat part 27 is formed thick. As a result, the flat part 27 rises in strength. Therefore, it is possible to prevent long term fluid pressure or temperature fluctuation from causing the flat part 27 to deform and collapse to the inside and possible to maintain the initial seal performance over a long period.

Figure 4:
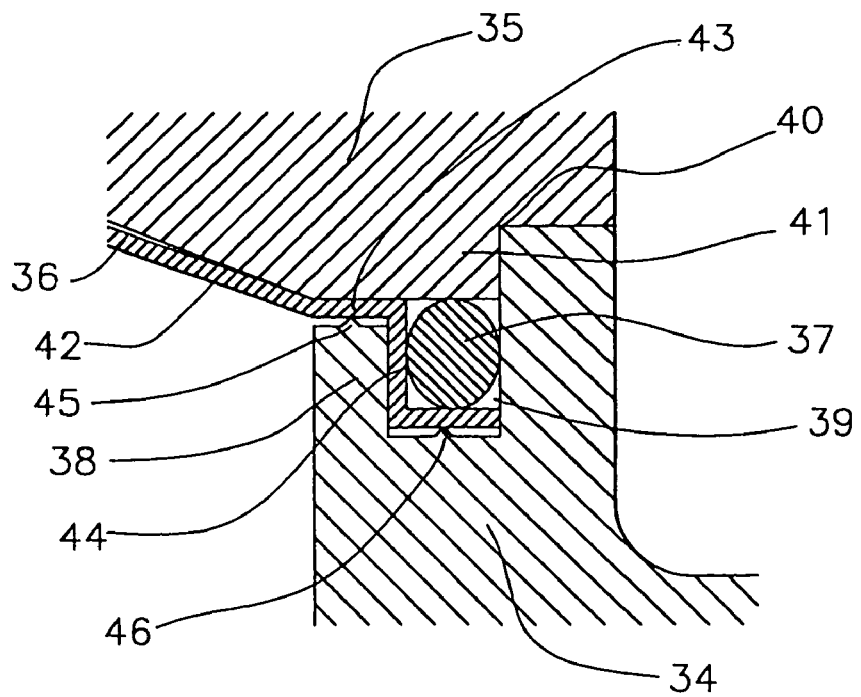
FIG. 4 is an enlarged sectional view showing principal parts of a valve according to a third embodiment of the present invention.

FIG. 4 is an enlarged longitudinal cross-sectional view showing principal parts of a valve according to a third embodiment of the present invention. The valve, in the same way as the first embodiment, is provided with a body 34, a bonnet 35, a diaphragm 36, and an O-ring 37. The body 34 has a flat part 38, an annular groove 39, and a step difference 40, the bonnet 35 has a projection 41, and the diaphragm 36 has a film part 42, a peripheral edge 43, and an annular engagement part 44. The point of difference in the configuration of this embodiment from the first embodiment is that the top surface of the flat part 38 of the body 34 and the bottom of the annular groove 39 are provided with annular projections 45, 46 of triangular shapes in cross-section. Since the rest of the configuration is the same as the first embodiment, an explanation will be omitted.

Figure 5:
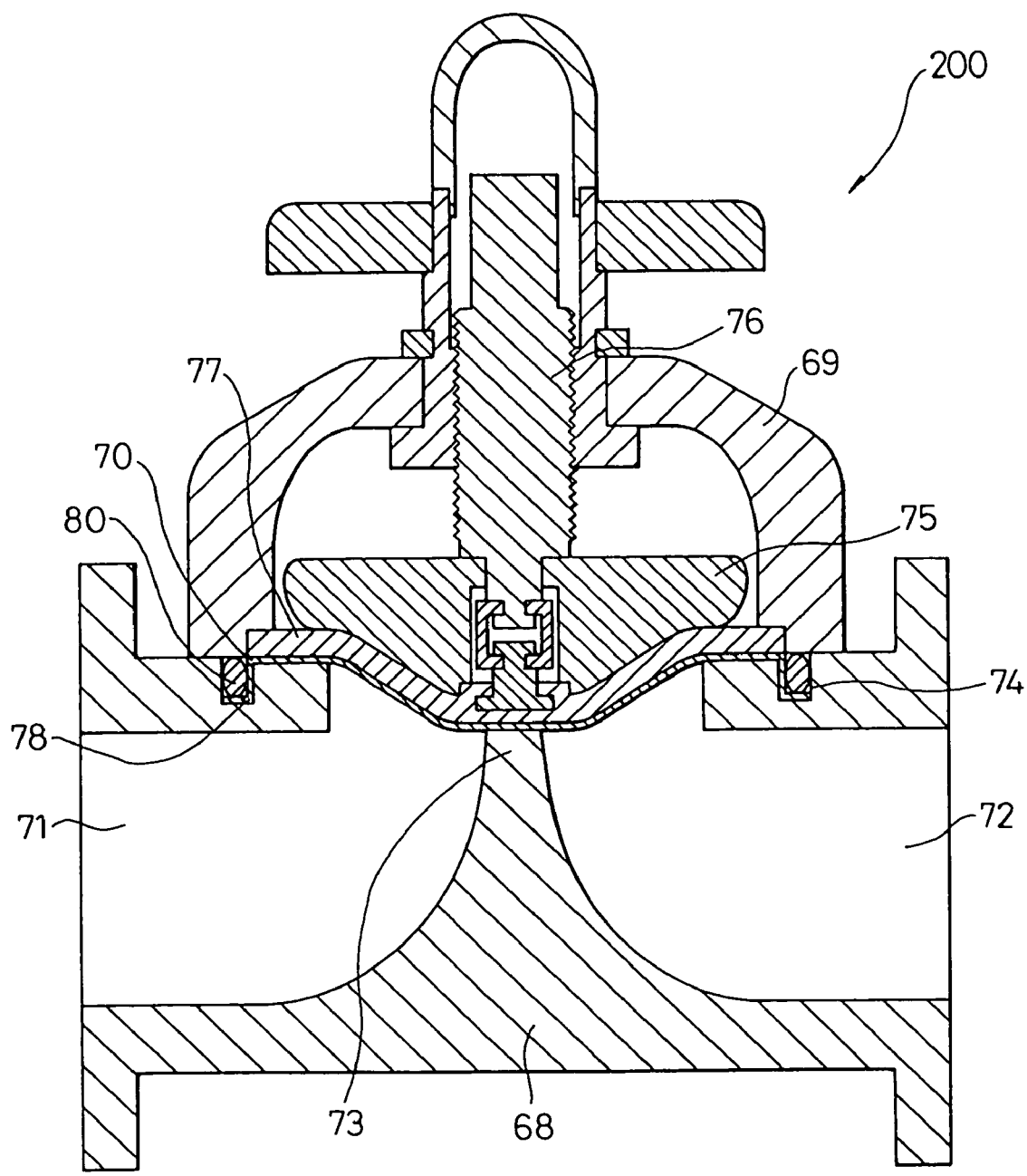
FIG. 5 is a longitudinal sectional view showing principal parts of a valve according to a fourth embodiment of the present invention.
Figure 6:
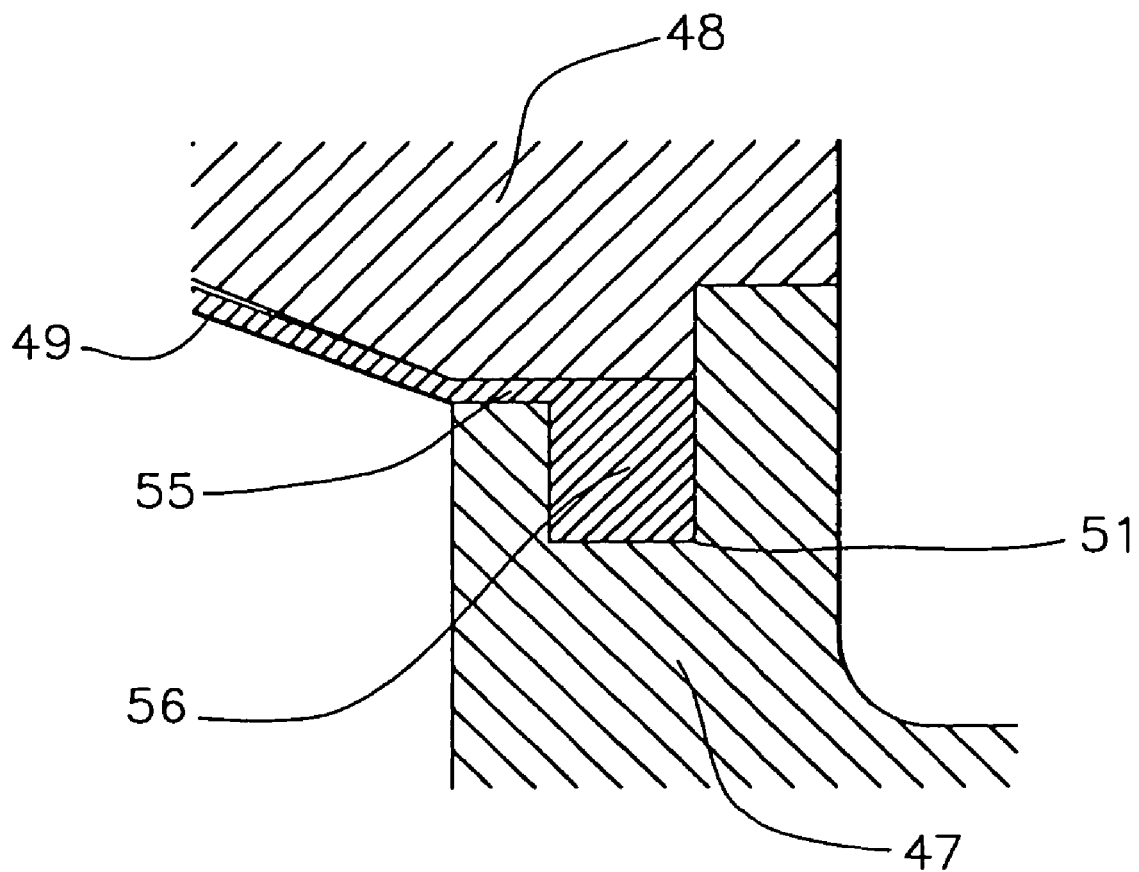
FIG. 6 is an enlarged longitudinal sectional view showing principal parts of a prior art.

FIG. 5 is a longitudinal cross-sectional view showing principal parts of a valve according to a fourth embodiment of the present invention. In the figure, a valve 200 is a diaphragm valve made of vinyl chloride resin and provided with a valve body 68 (hereinafter referred to as the "body"), a bonnet 69, and a diaphragm 70. The body 68 has an inlet channel 71 and an outlet channel 72 and further has a partition wall 73 having a gentle arcuate curved surface bending the channel between these two channels. The body 68 is provided at the top peripheral edge thereof with an annular groove 74 in the same way as the first embodiment. The compressor 75 is secured to the bottom end of a stem 76. The diaphragm 70 is a thin film made of a fluororesin and is backed by rubber elastic member 77 such as EPDM. It is secured to the bottom end of the compressor 75 and presses against or moves away from the top surface of the partition wall 73 to close or open the channel. The diaphragm 70 is formed at the peripheral edge thereof with an annular engagement part 78 of an approximate L-shape bent downward in the same way as in the first embodiment. The annular engagement part 78 is engaged with the annular groove 74 of the body 68, and the diaphragm 70 is clamped and held between the body 68 and the bonnet 69. Further, in the same way as the first embodiment, the outer side surface of the annular engagement part 78 is pressed against the inner side surface of the annular groove 74 by an elastic member constituted by an O-ring 80 made of fluororubber. The bottom surface is pressed by the bottom surface of the bonnet 69 via the O-ring 80 against the bottom surface of the annular groove 74. Here, the annular engagement part 78 and annular groove 74 may also be configured in the same way as the second and the third embodiments.

According to the seal structure of this present embodiment, the bottom surface of the peripheral edge 43 of the diaphragm 36 and the bottom surface of the annular engagement part 44 are pressed by the annular projections 45, 46. Therefore, the flow of the fluid to the outside of the valve is obstructed here. Further, the contact area between these annular projections 45, 46 and the diaphragm 36 becomes extremely small and, as a result, the pressing force becomes concentrated. Therefore, the seal effect becomes extremely large.

The present invention, being structured as explained above, enables extremely safe fluid control with no fluid leakage to the outside of the valve even if creep occurs at the seal part due to long term fluid pressure and temperature fluctuations.

LIST OF REFERENCE CHARACTERS

1 Body
2 Bonnet
3 Diaphragm
4 Compressor
5 O-ring
6 Fluid inlet
7 Fluid outlet
8 Separating wall
9 Opening
10 Valve seat
11 Valve chamber
12 Flat part
13 Annular groove
14 Step difference
15 Projection
16 Through-hole
17 Recess
18 Valve element
19 Film part
20 Peripheral edge
21 Annular engagement part
22 Male screw
23 Body
24 Bonnet
25 Diaphragm
26 Packing
27 Flat part
28 Annular groove
29 Step difference
30 Projection
31 Film part
32 Peripheral edge
33 Annular engagement part
34 Body
35 Bonnet
36 Diaphragm
37 Oring
38 Flat part
39 Annular groove
40 Step difference
41 Projection
42 Film part
43 Peripheral edge
44 Annular engagement part
45 Annular projection
46 Annular projection
47 Body
48 Bonnet
49 Diaphragm
51 Annular groove
55 Peripheral edge
56 Annular engagement part
57 Body
58 Bonnet
59 Diaphragm
60 O-ring
62 Annular groove
66 Peripheral edge
67 Annular engagement part
100 Valve

The invention claimed is:

1. A valve comprising a body having a valve seat formed therein, a bonnet, and a diaphragm abutting against and moving away from said valve seat, said body and said bonnet clamping and holding a peripheral edge of said diaphragm so as to seal the fluid inside said body, said valve characterized in that said valve further comprises an elastic member, said body is formed with an annular groove, said groove extending around said valve seat and defined by an inner side surface, an outer side surface and a bottom surface, said diaphragm is provided at the peripheral edge thereof with an annular engagement part, which is formed to be bent down from the peripheral edge thereof and have an approximate L-shape in cross-section so as to extend along the inner side surface and bottom surface of said annular groove, and said annular engagement part is fitted into said annular groove and pressed against the inner side surface and bottom surface of said annular groove in a tight state by said elastic member disposed in said annular groove and between said bonnet and said annular engagement part of said diaphragm.

2. The valve according to claim 1, wherein said annular groove has an inner side surface inclined downward toward the outside and said elastic member has an inner circumference inclined corresponding to said inclined surface of said annular groove.

3. The valve according to claim 1, wherein said elastic member is an O-ring.

4. The valve according to claim 1, wherein an annular projection abutting against the surface of the diaphragm is provided at the bottom surface of the annular groove.

5. The valve according to claim 1, wherein an annular projection abutting against the surface of said diaphragm is provided at the part of the surface of said body clamping said diaphragm with said bonnet.

* * * * *